(12) United States Patent
Cotlear De Witzmann et al.

(10) Patent No.: US 7,380,415 B2
(45) Date of Patent: Jun. 3, 2008

(54) COOKING DEVICE WITH A GLASS-CERAMIC PANEL PROVIDING A COOKING SURFACE IN A VARIETY OF DIFFERENT COLORS AND METHOD OF MAKING SAME

(75) Inventors: Monica Cotlear De Witzmann, Nieder-Olm (DE); Angelina Milanovska, Mainz (DE); Daniela Petto, Mainz-Kastel (DE); Dietmar Wennemann, Albig (DE); Dieter Schoenig, Mainz (DE); Friedrich Siebers, Nierstein (DE)

(73) Assignee: Schott AG, Mainz (DE)

( * ) Notice: Subject to any disclaimer, the term of this patent is extended or adjusted under 35 U.S.C. 154(b) by 670 days.

(21) Appl. No.: 10/913,058

(22) Filed: Aug. 6, 2004

(65) Prior Publication Data

US 2005/0016521 A1 Jan. 27, 2005

Related U.S. Application Data

(62) Division of application No. 09/948,418, filed on Sep. 7, 2001, now Pat. No. 6,794,020.

(30) Foreign Application Priority Data

Jul. 14, 2001 (DE) ................................. 101 34 374

(51) Int. Cl.
*C03C 10/00* (2006.01)
(52) U.S. Cl. ...................................................... 65/33.4
(58) Field of Classification Search ................. 65/33.4; 428/428, 67, 210, 432, 542.2, 701, 702
See application file for complete search history.

(56) References Cited

U.S. PATENT DOCUMENTS 5,716,712 A * 2/1998 Schonig et al. ............. 428/428
6,043,171 A * 3/2000 Siebers et al. ................ 501/66

* cited by examiner

*Primary Examiner*—Eric Hug
*Assistant Examiner*—Queenie Dehghan
(74) *Attorney, Agent, or Firm*—Michael J. Striker

(57) ABSTRACT

The glass ceramic panels are non-transparent and have at least one decoration. In order to fulfill the requirements for a glass ceramic panel that provides a cooking surface for a cooking unit in a variety of different pleasing colors, especially a creamy white color shade (BISQUE), in an economical manner, the glass ceramic panel has a predominant crystalline phase of keatite mixed crystals and a full-surface decorative coating that covers at least 80 percent of the upper smooth surface of the glass ceramic substrate. The full-surface decorative coating is provided in a different color from the glass ceramic panel. Methods for making these glass ceramic panels are described.

10 Claims, No Drawings

COOKING DEVICE WITH A GLASS-CERAMIC PANEL PROVIDING A COOKING SURFACE IN A VARIETY OF DIFFERENT COLORS AND METHOD OF MAKING SAME

This application is a divisional of patent application No. 09/948,418 filed Sep. 7, 2001, now U.S. Pat. No. 6,794,020.

BACKGROUND OF THE INVENTION

1. Field of the Invention

The present invention relates to a cooking device or unit with a glass-ceramic panel providing a cooking surface, which is not transparent and which has at least one decoration, on it. The invention also relates to a method of making this glass-ceramic panel.

2. Description of the Related Art

Cooking units or devices for modern kitchens including glass-ceramic panels providing cooking surfaces have been known for years and have proven completely satisfactory to customers. They are heated by a variety of different heating devices, including electrically heated radiant heating bodies, atmospheric gas burners, halogen radiators, gas heated burner units and induction heating devices.

These glass ceramic panels have a series of requirements, apart from their heating specifications. Especially the heating and operating parts under the glass ceramic panel in the cooking unit should not be observable from above the glass ceramic panel. Marks or streaks made during usage should not be conspicuous. Decorations, should be applied for aesthetic reasons and to demark functional areas, such as cooking zones, from other regions with different appealing colors.

The prior art provides a series of solutions for these requirements, which however have specific disadvantages.

In a typical known solution, like that described in EP 0 220 333, a colored glass-ceramic panel with high quartz mixed crystals as the predominant crystalline phase is employed. These glass-ceramic panels acting as cooking surfaces have been marketed for a long time, for example under the trademark CERAN® by Schott Glas. These cooking surfaces appear dark to black to the eye and thus prevent observation of the cooking unit interior.

The very smooth, lustrous aesthetically pleasing surfaces of the glass ceramic panels have certain susceptibilities for conspicuous marks or scratches on their surfaces that are caused by pots, metal abrasion and scrapes. Also fingerprints are conspicuous and noticeable. There is always an effort made of course to reduce the conspicuousness of marks on the glass ceramic panel by means of some type of decoration, for example an impervious decoration or even a full-surface decoration.

Thus EP 0 693 464 B1 describes a glass ceramic panel that is darkly colored and decorated on its upper surface, i.e. the cooking surface, with ceramic paints or pigments, on which at least one additional colored coating is arranged over a first colored coating, which at least partially overlaps the first colored coating. This first colored coating acts as a base decoration that coats a large area of the surface of the glass ceramic panel to form a uniform scratch-protecting layer. The other different colored coatings are marking decorations, e.g. for cooking zones, and simplify the confusion-free identification of the operating regions of the glass ceramic panel by means of the different colors.

Both decorations or colored coatings may overlap partially only in edge regions, because otherwise the colored coatings have difficulty adhering on each other, i.e. they have adherence problems. That is because of the different thermal expansion coefficients of the glass ceramic panel (which varies between $0\pm0.3\times10^{-6}$/K from 20 to 700° C.) and of the decorations, i.e. colored coatings (>about $5\times10^{-6}$/K). Only thin colored coatings having a thickness of up to about 7 μm allow the dark background of the glass ceramic panel to tube covered. Coatings with a larger thickness crack or split because of the differing thermal expansion coefficients, and/or poor adherence of the decorative coatings on these regions. Generally the possible colored embodiments are limited in the decoration of "black" glass ceramic panels because of the limited color coating thickness. The decorative paint produces only pale, less intense color shades and preferably only dark color shades. A bright decoration print is achievable by a full-surface printing only to a limited extent. Each screen-printing fault, local variation or removal of the bright decorative paint in usage is exceptionally conspicuous because of the underlying black glass-ceramic panel.

A coating for solution of these problems in the manufacture of a full-surface decorative coating with ceramic paints on a cooking surface provided by a darkly colored glass ceramic panel is described in German Patent Document DE 197 28 881 C1. This coating is made by applying at least two grid-like or raster-like structural patterns corresponding to each other and in a side-by-side relationship on the glass ceramic panel to form a closed full-surface covering coating. In order to obtain a full-surface completely covering coating the respective screens used in the printing process must fit exactly together (positive and negative structures). Even so, an arduous positioning must take place in this printing process. Two printing processes are required in order to obtain a full-surface completely covered appearance covering the "black" glass ceramic panel. The possible embodiments are limited by overlap of the decorative paints because of differing thermal expansion coefficients.

In order to avoid limitations during application of the decorative coating due to the dark color of the glass ceramic panel, attempts have been made to use a colorless, i.e. transparent glass ceramic panel with high quartz mixed crystals as the predominant crystalline phase. The non-transparency of the glass ceramic panel required to prevent observation of the interior of the cooking unit from above is provided by a printed colored coating.

German Patent Document DE 200 05 461 U1 discloses a colorless transparent glass ceramic panel that provides a cooking surface and is printed on its underside with a single layer or multi-layer coating of temperature-resistant paint. This colored coating provides the non-transparency, i.e. it replaces the otherwise usual coloring of the panel, so that the panel appears dark from above. Also the bottom-side coating on the glass ceramic panel is formed as a color-imparting decoration. In contrast, the upper side of the glass ceramic panel is decoration-free, in as much as it is not coated. However dirt, stains and the like, e.g. fingerprints, are conspicuous to some extent on this known cooking unit and there is no protection of the top surface from superficial scratches, metal rub-off and marks due to usage because there is only a single coating on the underside of the glass ceramic panel.

German Patent Document DE 200 19 210.8 U1 describes a cooking unit with a colorless transparent glass ceramic panel that provides a cooking surface, which has a single colored coating on its underside and a full-surface decorative coating on its upper side. To prove an acceptable full-surface appearance a coating must be provided on both the top and bottom sides of the glass ceramic panel because of its transparency. Screen printing errors or variations of the upper side full-surface decorative coating are partially compensated by the bottom side single colored coating. Printing both sides however is very expensive and special requirements exist for the coating on the bottom side of the glass ceramic panel. Also the embodiments are limited by overlap of the decorative paints because of the differing thermal expansion coefficients.

Beside the described dark-colored glass ceramic panels or transparent glass ceramic panels provided with a dark colored coating, opaque white glass ceramic panels and translucent white glass ceramic panels providing cooking surfaces are known in the art. These latter glass ceramic panels have keatite mixed crystals as the predominant crystalline phase and are usually available with higher thermal expansion coefficients of about 0.8 to $1.5 \times 10^{-6}$/K between 20 to 700° C. A multi-colored marking decoration is usually printed on the cooking surface side and burned in.

The phenomenon known as conspicuous staining, namely dirt, overflowing cooking materials and cleaning material residues necessarily collecting in scratches on the cooking surface during cooking, which are conspicuous on the white panel surface disadvantageously appear on these opaque white and translucent white glass ceramic panels.

An additional disadvantage is that the white glass ceramic panel becomes yellow colored in the vicinity of the heated cooking zone after shutting off the heating body. This coloring, designated thermochromism, is based on the thermal widening of the absorption band of $TiO_2$, a required ingredient of the glass ceramic material.

The already described German Patent Document DE 200 19 210.8 U1 discloses a translucent bright glass ceramic panel. In this special embodiment the colored pigments of the full-surface decorative coating on the topside and the single color coating on the underside are selected, so that the glass ceramic panel appears white or creamy white or weakly colored from above. This creamy white or weakly colored coating in connection with the upper side full-surface decorative coating reduces the conspicuousness of dirt, stains and the like, especially fingerprints, in a special manner. The topside full-surface decorative coating provides further protection from upper surface scratches, metal rub off and usage marks. However the other disadvantages described above remain.

To avoid the above-described disadvantages it is also known to provide the glass ceramic panel with a bright appearance, especially a bright beige or creamy white color shade, designated "BISQUE" in the following, by suitably coloring the glass ceramic panel in the starting glass melt. German Patent Document DE 198 57 117 A1 describes cooking unit with a opaque uniformly colored glass ceramic panel with keatite mixed crystals as the predominant crystalline phase, in which the cooking surface of ceramicizable glass is ceramicized in a color range in the lab system with a lightness value L<85. The cooking surface has minimal dirt and stain conspicuousness in usage because of this coloring.

It is disadvantageous for coloring the glass ceramic material in bulk by pigment oxides that this coloring must occur in the melt. It is not economical for the manufacturer to make different color shades according to customer choices because of the size of the melt vessel, since the material obtained cannot be used for making a new color shade by re-melting. Also a costly storage unit is required for the various color tones. The desire of the customer for individual color shades and comparatively small lots cannot be satisfied economically. This flexibility is lost because of the large-scale coloring by pigment oxides in the melt. Paint or pigment feeders are not available currently for the high temperatures, which are required in the glass ceramic melts.

SUMMARY OF THE INVENTION

It is an object of the present invention to provide glass ceramic panels in cooking units that do not require coloring of the melt, with cooking surfaces in a variety of preferably bright color shades, even in small quantities, in a flexible economical manner according to customer wishes, which prevent observation of the cooking unit interior and reduce the conspicuousness of usage marks caused by pot marks, metal rub-off, scratches and fingerprints on the surfaces of the glass ceramic panels.

This object and others, which will be made more apparent hereinafter, is attained in a cooking device or unit with a glass ceramic panel providing the cooking surface, which is not transparent and has at least one decoration.

According to the invention a glass ceramic panel with keatite mixed crystals as the predominant crystalline phase is provided with a colored full-surface decorative coating on a cooking surface side thereof, which covers at least 80 percent of the area of the cooking-surface side of the glass ceramic panel and which has any of a number of colors that are different from the color of the glass ceramic panel.

By the combining features that are themselves known according to the invention surprisingly glass ceramic panels providing cooking surfaces can be prepared economically which fulfill all the above-described requirements. Since a glass ceramic material with keatite mixed crystals acting as the principle crystalline phase in house, is translucent white or opaque white, alone determined by the type and size of the crystals in ceramicizing, fulfills all the requirements without special coloring of the melt, it is practically impossible to see into the cooking unit interior through the glass ceramic panel.

The light or bright color of the keatite glass ceramic material allows a comparatively thin full-surface decorative coating of ceramic paint, which is sufficiently different in color from the starting keatite glass ceramic material, to provide good coverage on the starting keatite glass ceramic material. Cooking surfaces with different, preferably light, colors, such as beige, almond and especially with a "BISQUE" appearance, are successfully prepared in an economical manner on the light background of keatite glass ceramic material.

Additional colors, such as blue, green, etc., are similarly possible according to customer requirements.

The economical and flexible manufacture of glass ceramic panels with a variety of different colored cooking surfaces means that the glass ceramic panel does not need to be colored in bulk. Thus it is possible to provide more flexibility, easier storage and smaller lots for the customers by the individualized embodiments, since the printing of full-surface decorative coatings provides different background colors more easily than by coloring the melt.

Additional advantages include reduced conspicuousness of usage marks on the surface caused by pot marks, metal wear-off, scratches and fingerprints. The background coating of the full-surface decorative coating behaves in this regard like a protective coating. In addition, concealment of visible defects in the glass ceramic panel, for example refining bubbles, streaks or other defects and manufacturing dependent color variations in the glass ceramic panel is also advantageous. Furthermore overlapping several decorations during the printing can provide a greater freedom in the selection of various embodiments.

An additional advantage exists in decorating glass ceramic panels with a decorative coating of darker colors in that the conspicuousness of the dirt and stains and thermochromism are avoided.

In contrast the colorless glass ceramic panel provided with a non-transparent paint has the advantage that only one side of the glass ceramic panel need be provided with a colored coating.

Although some of the features of the invention are known in part or individually, generally for separate situations with different technical requirements, the current state of the art provides no suggestion, as the following description shows, of the economical glass ceramic panels with the previously described properties that are made in an economical manner with the above described properties.

The requirements could be fulfilled first by coating the known typically dark glass ceramic panels with the paint desired by the customer (cooking unit marketing company) over their entire surface. However the requirements will not be fulfilled in this way since the applicable paint coating thickness (up to 7 μm) is too thin in order to provide the desired color on the dark background. Higher coating thickness, leads, as already mentioned, to flaking or chipping off of the paint because of the smaller thermal expansion coefficient of the glass ceramic. The cooking zone marking requires two colors, as much as possible with a total overlap of one coating. This however is not possible with a glass ceramic panel containing dark high quartz mixed crystals, since the paint chips off or flakes off.

Another way would be to coat a transparent glass ceramic panel with a suitable paint or to cover it with a suitable color, but the result would be that the color coverage would be poor. Because of the small thermal expansion coefficient of the glass ceramic containing the high quartz mixed crystals no sufficiently thick colored coatings are possible.

Up until now in practice the only practical way to color the glass ceramic has been to color the glass ceramic in the melt with a suitable color, which could be done only for a few color shades and would be very expensive. Furthermore, as already mentioned, color shades required by the customers, especially the pleasing BISQUE, could not be provided economically.

The above-described advantages stand out in embodiments of cooking units, in which the decorative coating covers at least 85 percent, preferably at least 92 percent, of the surface of the glass ceramic panel.

In a preferred embodiment of the cooking device the conspicuousness of the dirt and stains is advantageously minimized when the lightness value L* of the full-surface decorative coating is less than that of the uncoated keatite glass ceramic panel. With a decorative coating with a darker color than that of the keatite glass ceramic panel the conspicuousness of dirt and stains is notably less because the brighter glass ceramic shines through openings in the decorative coating present because of coating errors or rubbing away of coating material. That situation is less conspicuous than the reverse. Dirt or residue, which collects in the vicinity of the scratches or openings in the coating, conceals the brighter, glass ceramic underneath it.

According to another particularly advantageous embodiment particularly satisfactory colors of the cooking surface are obtained when the lightness value L* of the undecorated glass ceramic panel satisfies the condition L*>75. More color choices are possible for the cooking surface when the keatite glass ceramic panel is as white as possible in contrast to the decorative coating, when the white glass ceramic shines through the thin decorative coating of about 8 μm. A variety of different pastel shades and light brown colors may be obtained comparatively easily with a white glass ceramic panel. The neutral white background permits the greatest number of different colors, because a color subtraction with the different colored decorative coating occurs because of the shinning or glimmering through the coating. The colors of the colored region are obtained without mixing of the pigment color shades based on the white neutral point.

A simple cooking zone marking is possible according to another embodiment of the invention by not providing the full-surface decorative coating in the cooking zone on the cooking surface. Alternatively the decoration in the cooking zone has a lower or sunken surface coating and thus appears different. The omission of a portion of the coating or visually different decoration makes the cooking zone visible without the need to print a special second decorative coating for cooking zone marking.

According to another embodiment of the invention the application of the decorative coating by screen printing is especially satisfactory for a cooking area, in which the decorative coating contains up to 3 mm openings, or preferably up to 2 mm, sized openings, in which the glass ceramic panel is not decorated or coated. These openings do not visually interfere with the uniform appearance because of their small size. A full-surface decorative coating without openings is technically too difficult to make. Screen printing errors, such as small regions that are not printed, are very frequent. A certain optical "irregularity" arises, which covers the decorative coating faults, because of the invisible or scarcely visible openings due to the small dimensions of the openings, which are scarcely visible to the naked eye, when the color shades of the glass ceramic panel and the decorative coating are similar. In screen printing these openings (the decorative sieve is closed at these places) avoid the production of the so-called color noses or knobs, which mean optically conspicuous color streaks. The process production yield is thus increased by the presence of these openings.

The requirements of the customers for the BISQUE color shade may be fulfilled advantageously with a cooking surface having a full-surface decorative coating, with a light brown shade, such as beige, bisque, almond, with an appropriate lightness value L* of 70 to 90 and a coloredness value in the lab system of C*<30, preferably C*<20.

A wide variety of additional choices advantageously result when the decorative coating includes at least one additional decorative paint. The second decorative paint can be used to print cooking zone markings, logos or written characters. The second decorative paint can also be used in order to form features on the surface: structures, points or similar grids. The opportunity is thus presented to differentiate the cooking areas.

The application of both decorative paints may be simplified with a cooking surface on which the decorative paints at least partially overlap, which screen printing techniques easily permit. In contrast to black glass ceramic panels this is surprisingly possible with glass ceramic panels containing keatite mixed crystal as the principal crystalline phase because of the higher thermal expansion coefficients, even with complete overlap. According to the state of the art cited above, the former type of glass ceramic panels containing high quartz mixed crystals allow only a partial overlap because the colored coating or paint peels or flakes off.

The decoration with both colors can also be provided so that the decorative paints do not overlap and there are uncoated parts of the keatite glass ceramic panel between them. An additional color shade can be obtained without additional printing by means of the parts of the glass ceramic panel that are not decorated and glimmer through the decorative coating.

A cooking surface in which the decorative colors are formed by glass paints with a predetermined glass as glass flux and by ceramic pigments is particularly advantageous in regard to the permanence of the colors.

The decorative paints preferably are based on the same glass system in order to provide the good adherence of the decorative paints with overlapping printing and for an environmentally friendly method. This glass system is namely an alkaline borosilicate glass with the following composition in percent by weight: $SiO_2$, 40 to 65; $Al_2O_3$, 0 to 20; $B_2O_3$, 10 to 27; ZnO, 0 to 4; sum of alkali metal oxides $Li_2O+Na_2O+K_2O$, 2 to 15; sum of alkaline earth metal oxides, $MgO+CaO+SrO+BaO$, 0 to 12; optional additional ingredients, such as $TiO_2$, $ZrO_2$, $Sb_2O_3$, F, $Bi_2O_3$, $La_2O_3$, $SnO_2$, $P_2O_3$ can be contained in amounts of up to 10 percent by weight. The pigments, for example, can comprise one or more of pigments, such as $ZrSiO_4$, $TiO_2$, $CeO_2$; ceramic yellow pigments, such as Zr/Sr/Pr oxides, and brown pigments, such as Zn/Cr/Fe oxides.

A cooking surface with a two-tone decoration is appropriately formed so that both decorative paints have different pigments, but the same glass flux from the above-described alkaline borosilicate glass system. According to experience this is advantageous because then reactions and diffusion of ingredients of the glass flux into each other are avoided or there is a higher probability that the decorative coatings or paints are compatible with each other.

For the decorative paint from which the variously colored full-surface decorative coating is formed it is especially advantageous when they contain a glass flux with the following composition in percent by weight:

| | |
|---|---|
| $SiO_2$ | 43 to 58, |
| $Al_2O_3$ | 10 to 20, |
| $B_2O_3$ | 15 to 27, |
| $Li_2O$ | 0 to 5, |
| $Na_2O$ | 0 to 5, |
| $K_2O$ | <2, |
| $\Sigma Li_2O + Na_2O + K_2O$ | 1 to 10, |
| MgO | 0 to 3, |
| CaO | 0 to 4, |
| SrO | 0 to 4, |
| BaO | 0 to 4, |
| ZnO | 0 to 4, |
| $TiO_2$ | 0 to 3, |
| $ZrO_2$ | 0 to 4, |
| $Sb_2O_3$ | 0 to 2, |
| F | 0 to 3, |
| $Bi_2O_3$ | <3, |
| $La_2O_3$ | <3, |
| $SnO_2$ | <3, |
| $P_2O_5$ | <3, |
| $\Sigma Bi_2O_3 + La_2O_3 + SnO_2 + P_2O_5$ | <5, | and up to 30 percent by weight of one or more pigments that are stable at the ceramicizing or burning temperature.

The decorative coating composition corresponds to the glass flux described in German Patent Document DE 197 21 737 C1. The paint composition was developed especially for full-surface decoration on dark colored glass ceramic panels with high quartz mixed crystals. It has the properties required for a full-surface coating, such as a high bending tensile strength for the decorated article, a high resistance to acids and alkali, which are used in typical household cleaning agents and foodstuffs. Adherence, resistance to wear and insensitivity to spotting are additional desirable features, which means that there are no color changes caused by pyrolysis of overflowing food residues, for example on lead-containing decorative paints, in which special white or light paints can change color because of reduction of lead. It was surprisingly found that overlapping printing is possible with adherence without difficulties with these full-surface decorative coating of these compositions, when a glass ceramic panel with keatite mixed crystals is printed.

The pigments of the full-surface decorative coatings are preferably $ZrSiO_4$, $TiO_2$, $CeO_2$, ceramic yellow pigments comprising Zr/Sr/Cr oxides or Zn/Cr/Fe oxides, individually or preferably in mixtures.

An additional freedom of choice for the designer in regard to the decoration is possible advantageously in cooking surfaces in which a non-uniform appearance is obtained by a greater visually conspicuous grid or pattern comprising undecorated regions and/or different decorative paints. In this sort of embodiment the decorative coating organized in a more conspicuous pattern, which comprises either different paints and/or undecorated regions on the glass ceramic panel. The patterning then leads to a no longer uniformly colored appearance, as when the glass ceramic material is colored in bulk, but to other designer accents.

In order to minimize the differences in the thermal expansion coefficients of the decorative paints and the glass ceramic, one embodiment of the invention provides a cooking area, in which the thermal expansion coefficient of the glass ceramic panel with the keatite mixed crystals as predominant crystalline phase is greater than $0.8\times10^{-6}$/K between 20 to 700° C.

The higher thermal expansion of the glass ceramic with keatite mixed crystals instead of high quartz mixed crystals advantageously provides satisfactory adherence and the coating thickness, color and overlap of colors.

The glass ceramic panels for a cooking unit of the above-described type are made by a method comprising the following steps:

a) making a white translucent or white opaque glass ceramic panel with keatite mixed crystals as the predominant crystal phase, b) applying a full-surface colored decorative coating in a desired predetermined color shade on the smooth later-to-be cooking-surface side of the glass ceramic panel, which covers at least 80 percent of that side, and c) baking or burning in the pigment or paint of the decorative coating.

Since a burning in or baking in of the paint on the already ceramicized panel occurs at about 900° C. on the already ceramicized panel, one speaks of a secondary burning or baking in.

Alternatively, another method for making the glass ceramic panels of the above-described type includes the following steps:

a) making a green glass panel to be ceramicized, b) applying a full-surface colored decorative coating in the desired color shade on the smooth later-to-be cooking-surface side of the green glass panel, which covers at least 80 percent of that side, and c) ceramicizing the green glass panel to form a glass ceramic panel with keatite mixed crystals as the predominant crystalline phase while at the same time burning or baking in the paint or pigment of the decoration.

In both cases a full-surface decorative coating covers from 85 to 92 percent of the surface.

A process is provided in which this coating is first dried after application of a full-surface decorative coating as a background coating and after that a second paint is applied, for example, for marking purposes.

The drying occurs either in air or in a drier for 2 minutes at 180° C.

The marking decorations typically include cooking zone markings, marking for operating elements and company logos according to customer design.

As described previously a non-uniform appearance can be provided as desired by printing with different colors in a visually conspicuous pattern.

A simple application of the decorative colors is guaranteed by a method in which the decorations are applied by screen printing.

This technique is known in different forms and does not need to be described here further.

Advantageous examples of the invention are described in the following section.

EXAMPLES

Different keatite glass ceramics are made from commercially obtainable glass ceramics and act as substrates for the decorations. Keatite glass ceramics are produced by heat treating glass ceramics containing high quartz mixed crystals at high temperatures. The glass ceramics containing the high quartz mixed crystals are converted to the keatite glass ceramics by a subsequent heat treatment at higher temperatures, typically in a temperature range of 950° C. to 1150° C. Besides the glass compositions that contain most pigment oxides the heat treatment of the glass ceramics has a substantial influence on the color of the product. Like the case of the glass compositions, the higher the temperature of the conversion, the lighter the color shade. The still undecorated keatite glass ceramics obtained by the given heat treatment (Table I) are measured with a calorimeter in relation to a standard black background (Table I). The results for the color from the calorimeter are expressed in the CIELAB system in which $L^*$ designates the whiteness or lightness value, $a^*$ and $b^*$ designate the colors and $C^*$ designates the color or coloredness parameter, $C^*=\{(a^*)^2+(b^*)^2\}^{1/2}$.

The keatite glass ceramic from example 1 is obtained by conversion of a transparent black colored glass ceramic with high quartz mixed crystals, commercially obtained under the trademark CERAN® Hightrans (composition according to European Patent Application 0 220 333 B1). Example. 2 is a keatite glass ceramic, which was produced by conversion of a transparent black glass ceramic with high quartz mixed crystals, commercially obtained under the trademark CERAN® Color. Example 3 is a white opaque glass ceramic with keatite mixed crystals, which is obtained commercially under the trademark CERADUR®. Example 4 is a white translucent glass ceramic with keatite mixed crystals as the principal crystalline phase, which is obtained under the trademark CERAN® ArcticFire.

An area of about 350×200 mm² on 4 mm thick panels comprising a keatite glass ceramic substrate, which are about 380×250 mm², are decorated in order to make a test pattern. After baking in a full-surface decoration or print by screen printing techniques a test decoration is produced with two regions in which the full-surface coating is perforated by rectangular openings of 0.3 mm and/or 0.44 mm edge length. The surface coating corresponds here to 93% coverage. The coating thickness of the full-surface decorative coating is measured as 4 to 6 μm after bake in. Keatite glass ceramic substrates have a cooking-surface-side smooth lustrous surface and on the underside, as is generally the case with glass ceramic cooking panels, a knobbed surface structure. The decorative colors for the full-surface decorative coating comprise a composition of 87.5% by weight glass flux of the alkaline borosilicate system with the composition given in German Patent DE 197 21 737 C1 besides a screen printing oil, which is burned in a residue-free bake in. As pigments, 7.5 percent by weight of a commercial zirconium silicate pigment, 4.0 percent by weight of a commercial yellow pigment of Zr/Sr/Pr oxides from BASF and 1.0 percent by weight of a commercially obtained brown pigment comprising Zn/Cr/Fe oxide from BASF are contained.

After drying this full-surface decorative coating a second paint is printed by screen printing. This colored second decorative paint completely overlaps the full-surface decorative coating. The second decorative paint contains a glass flux from the alkaline borosilicate system with a composition as described in German Patent Document 198 34 801 A1. As pigments, 16 percent by weight of a commercial $TiO_2$ white pigment of Bayer and 4 percent by weight of a commercially obtained Co/Ni/Mn/Cr/Fe/Al containing black pigment of CERDEC are used.

In order to illustrate different test structures this second colored coating comprises equal triangles each having a base of about 30 mm and about 100 mm. This geometry is used to study the effect of different overlap widths. Furthermore different shades are provided in a lithographic manner by means of screen printing techniques. This means that the open portions of the screen mesh are closed in a stepwise manner by a screen printing machine with a very fine resolution,in stages of 100, 80, 60, 40, and 20 percent. The pattern formed is visually observable with a predetermined resolution under about 40 percent shade value. Above about 40% of the open portion the decorative coating appears uniform. The color depth or intensity is made greater or lesser according to the shade desired based on different pigment or paint amounts.

After drying the decorative paints are baked or burned in during a secondary baking or burning process at about 900° C. After the baking or burning in the color parameters of both the first full-surface decorative coating and the region printed with the second decorative coating (100% shade value) are fixed in the lab system. The measurement occurs in the region in which the full-surface decorative coating contains no openings.

Properties of the patterned glass ceramic panel for the particular application were tested.

The adherence on the region with the full-surface decorative coating (with and without openings) and especially in the region with the completely overlapping decoration from both colors was tested. A strip of transparent adhesive film (Tesafilm TYP 4104, Beiersdorf Co.) was glued or pasted on the baked or burned in decorative coating. The strip was vigorously rubbed and then torn off. After that, a judgment was made regarding how many particles of the coating adhered to the strip. The value "0" indicates no particles adhering to the strip (best coating embodiments), "1" means that a few particles were adhering, "2" means a larger number of particles were adhering than in the case of "1", "3" means that regions of the decorative coating were torn off. The values "0" and "1" were viewed as uncritical from a practical standpoint.

Scratches, dirt and stains and fingerprints were judged by testing the decorative patterned panel in practice. The test parameters were determined by comparison of the coated or decorated panel of the invention to an untreated patterned panel. The parameter "0" indicated no detectable change, "1" indicated very little change (uncritical), "2" indicated a noticeable change (troublesome) and "3" indicated a very conspicuous change (very troublesome).

Different conventional cooking vessels made from enameled porcelain, stainless steel and aluminum are used to determine the conspicuousness of scratches. These cooking vessels were pushed against a weight of 2 kg 50 times on the decorated cooking surface in practice. A judgment regarding the tracks or marks was made visually with the naked eye under conventional illumination from a distance of one meter.

To test to determine the conspicuousness of stains and dirt first visible scratches are produced with emery or abrasive paper with grain size 40. Then very different food residues or stains were baked in by means of a hot radiating body and subsequently the patterned panel was cleaned with a cleaning agent suitable for glass ceramic cooking surfaces. Fingerprint conspicuousness was determined with different sources of illumination (halogen lamp, daylight). Undecorated regions of the patterned panel were measured for comparison.

Table I shows the results for testing the various examples of the glass ceramic panels of the invention. The undecorated keatite glass, ceramic, obtained commercially under the Trademark ArcticFire®, was used as a comparison example and the comparison results appear in Table I. This undecorated keatite glass ceramic was also used as the substrate for example 4. This keatite glass ceramic provides a very smooth lustrous surface with the described sensitivity for, marks including scratches, stains and dirt and fingerprints.

As the measured values of the parameters shown in Table I show, the decorative coating according to the invention provide the desired colors of the cooking surface and the desired improvement regarding the usage marks, such as the dirt and stain susceptibility, the scratch susceptibility and the fingerprint susceptibility. Furthermore the colored decorations satisfy the requirements for good adherence of the coating with completely overlapping printing. The decorative coatings with the above-described compositions are in a position to provide full-surface decorations on keatite glass ceramic panels of different compositions and colors. Furthermore the decorative coatings have the good properties required for these colored cooking surfaces, including heat resistance, spot insensitivity, chemical resistance and wear properties.

TABLE I

COLOR PARAMETERS AND OTHER PROPERTIES OF GLASS CERAMIC PANELS WITH DECORATIVE COATINGS ACCORDING TO THE INVENTION AND UNDECORATED GLASS CERAMIC PANELS

| | EXAMPLE | | | | |
| --- | --- | --- | --- | --- | --- |
| | 1 | 2 | 3 | 4 | 5 Comparison (undecorated) |
| Heat treatment (Tmax, tmax) | 1090° C. 2 h | 1090° C. 2 h | 1090° C 2 h | 1080° C. 10 min | 1080° C., 10 min |
| Undecorated Keatite glass ceramic | | | | | |
| Color shade | Gray | Violet | Opaque white | Translucent white | Translucent white |
| Whiteness value L* | 50.1 | 50.8 | 89.3 | 83.9 | 83.96 |
| a* | 0.7 | 5.9 | −0.5 | −3.1 | −3.1 |
| b* | −4.5 | −26.5 | −0.8 | −4.6 | −4.6 |
| Color value C* | 4.6 | 27.1 | 0.9 | 5.5 | 5.5 |
| Full-surface decorative coating | | | | | |
| Color shade | Light Grey | Lilac | Ivory | Bisque | |
| Whiteness value L* | 50.9 | 52.8 | 85.6 | 79.4 | |
| a* | 0.4 | 3.6 | 0.3 | −2.4 | |
| b* | 0.2 | −18.8 | 10.3 | 6.2 | |
| Color value C* | 0.4 | 19.1 | 10.3 | 6.6 | |
| Second Decoration Color (100% shade) | | | | | |
| Color shade | Dark Grey | Dark Grey | Dark Grey | Grey Brown | |
| Whiteness value L* | 36.3 | 36.4 | 56.5 | 54.7 | |
| a* | 0.4 | 1.2 | 0.8 | −0.3 | |
| b* | 1.1 | −7.5 | 6.2 | 2.9 | |
| Color value C* | 1.2 | 7.6 | 6.3 | 2.9 | |
| Decorative Coating Properties | | | | | |
| Adherence | 0 | 0 | 0 | 0 | — |
| Scratch Susceptibility | 1 | 1 | 1 | 1 | 2-3 |
| Stain and dirt | Not | Not | Not | 1 | 3 |

TABLE I-continued

COLOR PARAMETERS AND OTHER PROPERTIES OF GLASS
CERAMIC PANELS WITH DECORATIVE COATINGS ACCORDING TO THE
INVENTION AND UNDECORATED GLASS CERAMIC PANELS

| | EXAMPLE | | | | |
|---|---|---|---|---|---|
| | 1 | 2 | 3 | 4 | 5 Comparison (undecorated) |
| Susceptibility Fingerprint susceptibility with Decoration | measured 0 | Measured 0 | Measured 0 | 0-1 | — |
| Fingerprint susceptibility without Decoration | 1 | 1-2 | 1 | 2 | 2 |

The disclosure in German Patent Application 101 34 374.4 of Jul. 14, 2001 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a cooking device with a glass ceramic panel providing a cooking surface and method of making the glass ceramic panel, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A method of making a decorative glass ceramic panel for a cooking unit, wherein said decorative glass ceramic panel is not transparent and comprises a glass ceramic panel having a predominant crystalline phase of keatite mixed crystals and a colored full-surface decorative coating provided on a cooking-surface side of the glass ceramic panel, said decorative coating covering at least 80 percent of the cooking-surface side of the glass ceramic panel and having a different color than said glass ceramic panel; said method comprising the steps of:
   a) making a translucent or opaque white glass ceramic panel comprising said predominant crystalline phase of said keatite mixed crystals with a smooth side;
   b) applying said colored full-surface decorative coating on said smooth side of the translucent or opaque white glass ceramic panel so that said colored full-surface decorative coating covers at least 80 percent of the smooth side; and
   c) baking or burning in at least one ceramic pigment included in the full-surface decorative coating;
   wherein said colored full-surface decorative coating comprises a glass flux and up to 30 percent by weight of said at least one ceramic pigment so that said colored full-surface decorative coating has a color shade with a lightness value $L^* > 70$, and said at least one ceramic pigment is selected from the group consisting of $ZrSiO_4$, $TiO_2$, $CeO_2$, yellow pigments containing at least one Zr/Sr/Pr oxide and brown pigments containing at least one Zn/Cr/Fe oxide; and
   wherein said lightness value $L^*$ of said color shade of said full-surface decorative coating is less than a lightness value $L^*$ of a color shade of said white glass ceramic panel, whereby said color shade of said full-surface decorative coating cooperates with said color shade of said white glass ceramic panel to reduce conspicuousness of usage marks, metal rub-off, scratches and fingerprints and prevent observation of a cooking device interior.

2. A method as defined in claim 1, wherein said colored full-surface decorative coating is a background coating, and further comprising drying said colored full-surface decorative coating and after said drying applying a decorative paint.

3. A method as defined in claim 2, wherein said full surface decorative coating and said decorative paint are applied by screen printing methods.

4. The method as defined in claim 1, wherein said glass flux is lead-free and is an alkaline borosilicate glass flux with the following composition, in percent by weight based on oxide content: $SiO_2$, 40 to 65; $Al_2O_3$, 0 to 20; $B_2O_3$, 10 to 27; ZnO, 0 to 4; sum of alkaline earth oxides $\Sigma MgO+CaO+SrO+BaO$, 0 to 12; and sum of alkali metal oxides, $\Sigma Li_2O+Na_2O+K_2O$, 2 to 15; $TiO_2$, 0 to 10; $ZrO_2$, 0 to 10; $Sb_2O_3$, 0 to 10; F, 0 to 10; $Bi_2O_3$, 0 to 10; $La_2O_3$, 0 to 10; $SnO_2$, 0 to 10; and $P_2O_5$, 0 to 10.

5. The method as defined in claim 1, wherein said glass flux is lead-free and is an alkaline borosilicate glass flux with the following composition, in percent by weight based on oxide content: $SiO_2$ 43 to 58$_1$, $Al_2O_3$ 10 to 20, $B_2O_3$ 15 to 27, $Li_2O$ 0 to 5, $Na_2O$ 0 to 5, $K_2O<2$, $\Sigma Li_2O+Na_2O+K_2O$ 1 to 10, MgO 0 to 3, CaO 0 to 4, SrO 0 to 4, BaO 0 to 4, ZnO 0 to 4, $TiO_2$ 0 to 3, $ZrO_2$ 0 to 4, $Sb_2O_3$ 0 to 2, F 0 to 3, $Bi_2O_3<3$, $La_2O_3<3$, $SnO_2<3$, $P_2O_5<3$, $\Sigma Bi_2O_3+La_2O_3+SnO_2+P_2O_5<5$.

6. A method of making a decorative glass ceramic panel for a cooking unit, wherein said decorative glass ceramic panel is not transparent and comprises a glass ceramic panel having a predominant crystalline phase of keatite mixed crystals and a colored full-surface decorative coating provided on a cooking-surface side of the glass ceramic panel, said colored full-surface decorative coating covering at least 80 percent of the cooking-surface side of the glass ceramic panel and having a different color than said glass ceramic panel; said method comprising the steps of:
  a) making a green glass panel to be ceramicized with a smooth side,
  b) applying said colored full-surface decorative coating on the smooth side of the green glass panel so that the colored full-surface decorative coating covers at least 80 percent of the smooth side, and
  c) after the applying of step b), ceramicizing the green glass panel and, at the same time, burning or baking in at least one ceramic pigment included in the colored full-surface decorative coating in order to form said decorative glass ceramic panel;
  wherein said colored full-surface decorative coating comprises a glass flux and up to 30 percent by weight of said at least one ceramic pigment so that said colored full-surface decorative coating has a color shade with a lightness value L*>70, and said at least one ceramic pigment is selected from the group consisting of $ZrSiO_4$, $TiO_2$, $CeO_2$, yellow pigments containing at least one Zr/Sr/Pr oxide and brown pigments containing at least one Zn/Cr/Fe oxide; and
  wherein said lightness value L* of said color shade of said full-surface decorative coating is less than a lightness value L* of a color shade of said glass ceramic panel, whereby said color shade of said full-surface decorative coating cooperates with said color shade of said glass ceramic panel to reduce conspicuousness of usage marks, metal rub-off, scratches and fingerprints and prevent observation of a cooking device interior.

7. A method as defined in claim 6, wherein said colored full-surface decorative coating forms a background coating, and further comprising drying said colored full-surface decorative coating and after the drying applying a decorative paint thereto.

8. A method as defined in claim 7, wherein said full surface decorative coating and said decorative paint are applied by screen printing methods.

9. The method as defined in claim 6, wherein said glass flux is lead-free and is an alkaline borosilicate glass flux with the following composition, in percent by weight based on oxide content: $SiO_2$, 40 to 65; $Al_2O_3$, 0 to 20; $B_2O_3$, 10 to 27; ZnO, 0 to 4; sum of alkaline earth oxides $\Sigma MgO+CaO+SrO+BaO$, 0 to 12; and sum of alkali metal oxides, $\Sigma Li_2O+Na_2O+K_2O$, 2 to 15; $TiO_2$, 0 to 10; $ZrO_2$, 0 to 10; $Sb_2O_3$, 0 to 10; F, 0 to 10; $Bi_2O_3$, 0 to 10; $La_2O_3$, 0 to 10; $SnO_2$, 0 to 10; and $P_2O_5$, 0 to 10.

10. The method as defined in claim 6, wherein said glass flux is lead-free and is an alkaline borosilicate glass flux with the following composition, in percent by weight based on oxide content: $SiO_2$ 43 to 58, $Al_2O_3$ 10 to 20, $B_2O_3$ 15 to 27, $Li_2O$ 0 to 5, $Na_2O$ 0 to 5, $K_2O$<2, $\Sigma Li_2O+Na_2O+K_2O$ 1 to 10, MgO 0 to 3, CaO 0 to 4, SrO 0 to 4, BaO 0 to 4, ZnO 0 to 4, $TiO_2$ 0 to 3, $ZrO_2$ 0 to 4, $Sb_2O_3$ 0 to 2, F 0 to 3, $Bi_2O_3$<3, $La_2O_3$<3, $SnO_2$<3, $P_2O_5$<3, $\Sigma Bi_2O_3+La_2O_3+SnO_2+P_2O_5$<5.

* * * * *